United States Patent [11] 3,619,493

[72] Inventors Robert E. Krallinger; Edward G. Keplinger; Jerry W. Terrell, all of New Milford, Conn.

[21] Appl. No. 785,495
[22] Filed Dec. 20, 1968
[45] Patented Nov. 9, 1971
[73] Assignee Graphic Sciences, Inc. Danbury, Conn.

[54] AUTOMATIC GAIN CONTROL FOR GRAPHIC DATA TRANSMISSION SYSTEM
14 Claims, 2 Drawing Figs.

[52] U.S. Cl. .......... 178/6
[51] Int. Cl. .......... H04n 1/32, H04n 1/06
[50] Field of Search .......... 178/6, 7.5; 315/22

[56] References Cited
UNITED STATES PATENTS

| | | | |
|---|---|---|---|
| 3,427,496 | 2/1969 | Wood | 315/22 |
| 2,443,434 | 6/1948 | Sprague | 178/6 |
| 3,515,803 | 6/1970 | Lorang | 178/7.1 |
| 2,804,494 | 8/1957 | Eliot | 178/7.1 |

*Primary Examiner*—Robert L. Griffin
*Assistant Examiner*—Barry Leibowitz
*Attorney*—Blair, Cesari and St. Onge

ABSTRACT: A facsimile transmission system in which the content of an original document is transmitted by means of an amplitude modulated carrier includes a transmitter that periodically transmits a gain standardizing signal having a predetermined level relative to a given document tone. The receiver includes a gain control circuit that responds selectively to the gain standardizing signal by charging or discharging a storage capacitor to a control voltage that controls the receiver gain so as to provide a standard input voltage for a printer that prints a facsimile of the original document.

Figure 1:
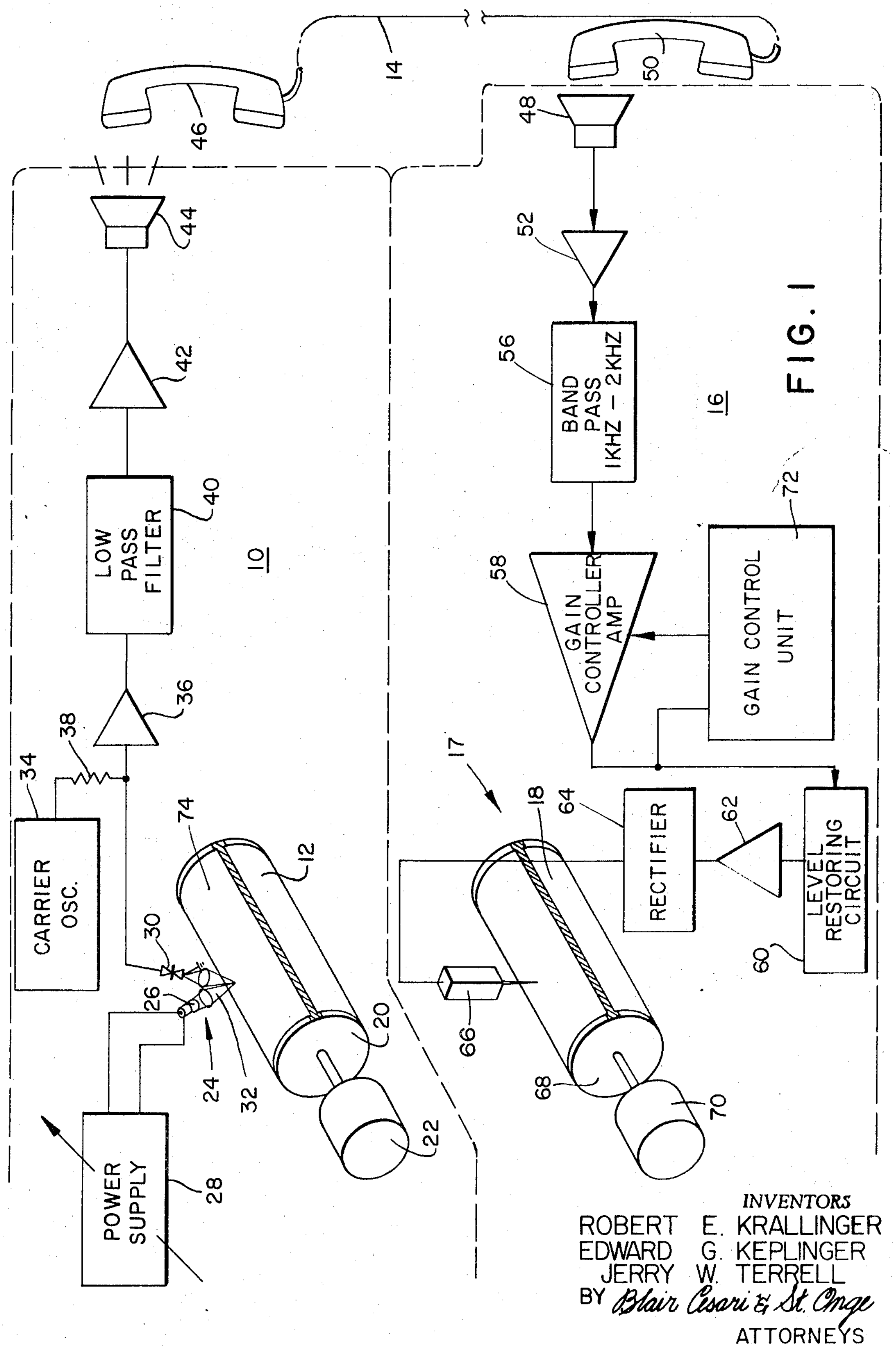

INVENTORS
ROBERT E. KRALLINGER
EDWARD G. KEPLINGER
JERRY W. TERRELL
BY Blair Cesari & St. Onge
ATTORNEYS INVENTORS
ROBERT E. KRALLINGER
EDWARD G. KEPLINGER
JERRY W. TERRELL
BY Blair Cesari & St. Onge
ATTORNEYS

AUTOMATIC GAIN CONTROL FOR GRAPHIC DATA TRANSMISSION SYSTEM

INTRODUCTION

Field of the Invention

This invention relates to a facsimile system. More particularly, it relates to a facsimile system using the telephone system as a transmission medium.

BACKGROUND OF THE INVENTION

The telephone system has long been used to transmit to remote locations the contents of documents of various types. For example, newspapers have for many years received photographs by transmission from news sources over telephone lines.

The present invention, while directed primarily to a facsimile system using the same transmission medium is concerned with a different user. Specifically, it relates to a businessman or other person who wishes to engage in facsimile transmission from different locations in the course of day-to-day travels. It relates also to office personnel who wish to transmit and receive from their individual desks and to other uses of a similar nature. For these applications, the facsimile unit should be a transceiver, i.e. ranged for both transmission and reception of documents. It should be small, easily transportable, quiet in operation and inexpensive. It should not require a direct connection to the telephone line and it should be operable by unskilled personnel. Moreover, it should not require special conditioning of the telephone line between the transmitter and receiver.

U.S. Pat. No. 3,392,232 for FACSIMILE TRANSMISSION SYSTEM describes a system that is basically capable of providing these features. An alternating current generator applies a carrier to a circuit path leading to the telephone line or other transmission medium. A photodetector in the form of a photosensitive diode or resistor is connected in shunt across the circuit path and arranged to scan the document to be transmitted. The detector thus shunts more or less of the output of the carrier generator according to the tones (lightness or darkness) of successive minute segments of the document. In particular, the lighter the segment of the document beneath the detector, the greater will be the portion of the generator output shunted by the detector. Thus, the carrier transmitted over the telephone is amplitude-modulated by the photodetector. The receiver at the other end of the line reproduces the document by making the tones of successive segments of a facsimile correspond with the instantaneous amplitude of the received carrier.

The present invention relates to an improvement of this system and in particular it relates to an automatic gain control arrangement in the receiver that standardizes the signal applied to the device that "prints" the facsimile of the transmitted document. Unless this signal is standardized so as to have a predetermined correspondence with the signal transmitted from the transmitter, the tones of the various points in the facsimile will not correspond with the tones of the same points in the original. If the transmission conditions were the same from one transmission to the next, one might manually set the receiver to provide the correct signal level for the printing device. However, as pointed out above, the system is intended for use between different points during different transmissions and the transmission characteristics of the telephone system will therefore vary considerably from one transmission to the next.

Moreover, since the facsimile system is intended for operation over conventional telephone voice channels, successive transmissions between the same points will generally be over different paths having different characteristics. Indeed, the characteristics of a telephone connection will often vary during a transmission. This problem is compounded when the facsimile system employs acoustic coupling to the telephone line by way of a conventional telephone handset at the transmitter in order to avoid the necessity of a direct connection to the telephone line. The degree of coupling into the telephone line may vary because of the different characteristics in the individual carbon microphones used in the handsets and also because the characteristics of any given microphone will change as the packing of the carbon granules therein varies.

One might expect to overcome this problem by means of a conventional automatic gain control circuit. However, operation of these circuits requires that the variation in signal strength due to changes in transmission characteristics be at a different rate than the changes in signal strength due to modulation at the transmitter. Otherwise, the gain control circuit cannot distinguish between these two causes of signal variation. In the facsimile system with which the present invention is concerned, the transmission characteristics will often vary at the same rate as the document reflectivity sensed by the photodetector. Thus, they may be indistinguishable from the modulation and a conventional gain control will not separate satisfactorily.

This problem is compounded by the fact that the modulation arrangement described above provides downward or absorption modulation, wherein the amplitude of the carrier depends upon the degree of modulation. Thus, even with a modulation rate substantially different from the rate of change of transmission characteristics, a conventional gain control circuit, which requires a transmitted carrier of constant amplitude, will not suffice.

Accordingly, a principal object of the present invention is to provide a facsimile system adapted for use over transmission media having substantially different characteristics. A more specific object of the invention is to provide a facsimile system adapted for use over telephone circuits and between different locations for different transmissions.

Another object is to provide a system of the above type that is compatible with acoustic or inductive coupling between the telephone system and the facsimile transmitter and receiver.

A further object of the invention is to provide a system of the above type that automatically compensates for differences between the characteristics of different telephone lines and also for changes in such characteristics during a transmission period.

Yet another object of the invention is to provide a system of the above type employing downward or absorption modulation.

A still further object of the invention is to provide a signal-standardizing circuit for use in a facsimile system of the above type.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

SUMMARY OF THE INVENTION

In a facsimile system incorporating the invention the transmitting unit periodically transmits a standard signal corresponding to a predetermined document tone. A gain control unit in the receiver selectively responds to this signal by adjusting the receiver gain to provide a printing signal corresponding with that tone. Preferably, the tone is black and an efficient way for the transmitter to develop the standard signal is to have the document-scanning photodetector pass over a black area periodically. This is easily accomplished by providing a black band along an edge of the document so that the photodetector passes over this band prior to or after the scanning of each line. With this arrangement, no additional circuits are required for the transmitter to develop the standardizing signal.

As with a conventional automatic gain control circuit, the gain control signal developed in the receiver is in the form of a voltage on a capacitor, this voltage being modified in accordance with the level of the incoming standardizing signal. In the present system, this capacitor has a relatively long discharge time constant since its voltage must not change appreciably between successive transmissions of the standardizing signal. Otherwise, the tone of the reproduced document will undesirably vary along each line.

On the other hand, the gain control circuit must provide for rapid discharge of the capacitor when the level of the standard signal drops at the receiver. To accomplish this, we have included an active discharge circuit which responds to a drop in the amplitude of the standard signal by connecting a rapid discharge path to the capacitor. This quickly reduces the control voltage and thereby provides a rapid increase in amplifier gain to compensate for the changed transmission characteristic.

Figure 2:
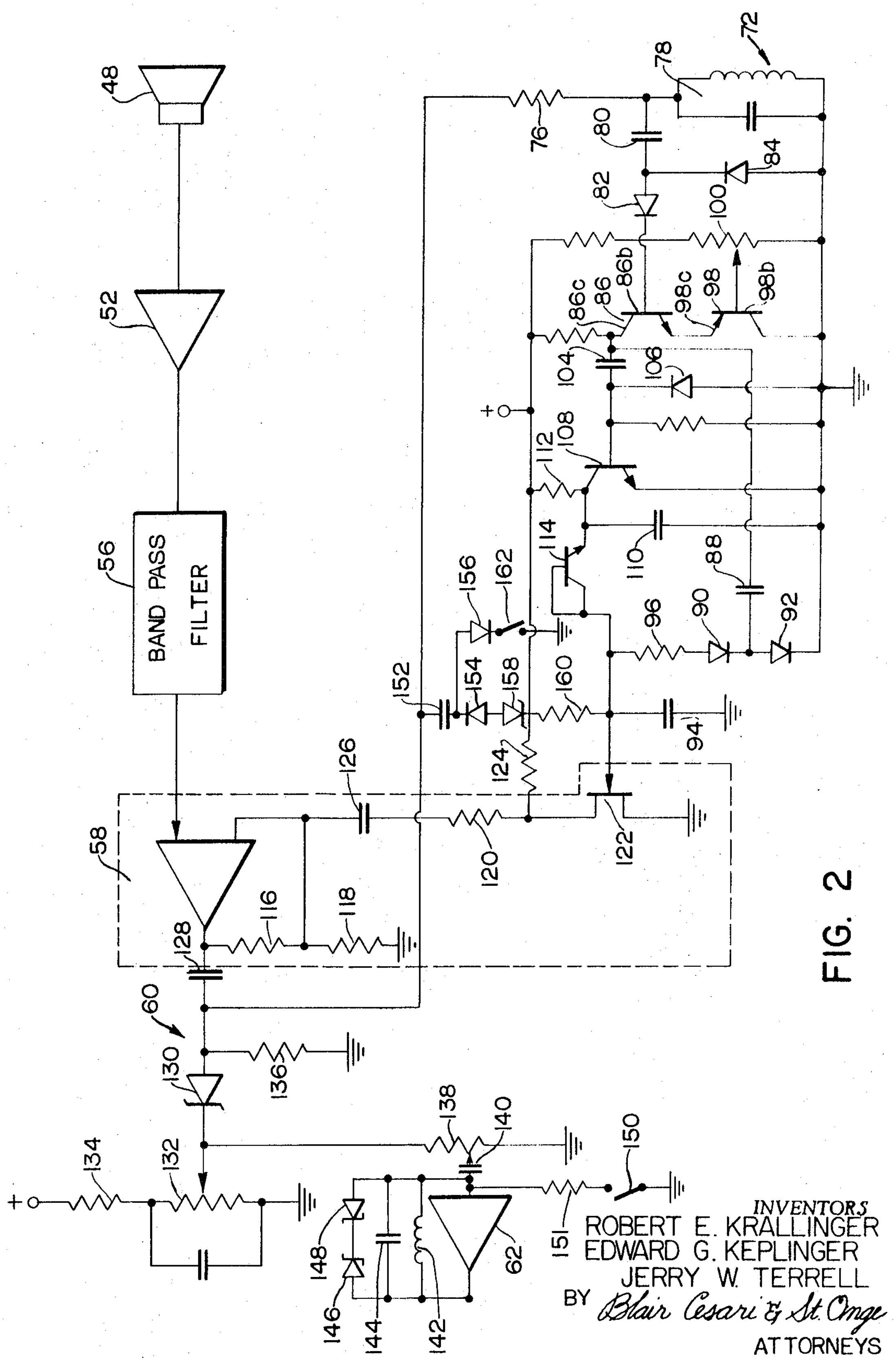

For a fuller understanding of the nature and objects of the invention, reference should be made to the following detailed description taken in connection with the accompanying drawings, in which:

FIG. 1 is a schematic diagram in block form of a facsimile transmission system embodying the invention; and FIG. 2 is a detailed schematic diagram of the signal level standardizing arrangement used in the system of FIG. 1.

As shown in FIG. 1, a facsimile system incorporating the invention typically includes a transmitter generally indicated at 10 that transmits the contents of an original document 12 over a telephone connection 14 to a receiver 16. The receiver 16 in turn includes a printer 17 that prints a facsimile reproduction 18 of the document 12. Ordinarily, the system comprises a pair of transceivers at opposite ends of the telephone line. That is, the transmitter 10 is associated with a receiver (not shown) and similarly, the receiver 16 is associated with a transmitter (not shown), so that each of the units is capable of facsimile transmission and reception. For the sake of clarity, we have omitted these additional elements from the description of the present invention.

With further reference to FIG. 1, the document 12 is mounted on a drum 20 rotated by a motor 22. A scanning head 24 positioned adjacent to the surface of the drum scans the document point-by-point and develops an electrical output corresponding to the reflectivities of successive points. Specifically, the head 24 scans along a substantially horizontal line of the document 12 each time the drum 20 makes a revolution and it then scans along an adjacent line during the next drum revolution. Preferably, the longitudinal movement of the head 24 is accomplished by a lead screw arrangement (not shown) that continually advances the head 24 along the drum as the latter rotates. Thus, the head actually scans successive points along a helical path around the surface of the document 12. A scanning arrangement of this type is described in the copending application of Eric A. von Hippel et al. for PAPER FEED CABLE INDEXING SYSTEM, Ser. No. 753,542, filed Aug. 19, 1968 now Pat. No. 3,578,909.

The scanning head 24 includes a light bulb 26 energized by an adjustable power supply 28. The light from the bulb 26 is converged to a point on the surface of the drum 20 and the light reflected from that point is focused onto a photodetector 30 by means of an intervening optical assembly 32. Preferably, the assembly 32 is arranged so that the photodetector receives diffusely reflected light from the bulb 26 but not specularly reflected light.

As shown, the detector 30 is preferably a photodiode connected in shunt across the circuit path between a carrier oscillator 34 and an amplifier 36. In particular, the detector 30 forms a voltage divider with a series resistor 38. Accordingly, as the portion of the document 12 being scanned varies from dark to light, the reflectivity of the document increases and the resistance of the photodetector 30 decreases. This causes a corresponding decrease in the input voltage of the amplifier 36. Thus, the photodetector is connected as an absorption modulator of the output of the oscillator 34, with black areas of the document 12 providing the maximum output from the modulator and the modulator output decreasing as one progresses from black toward white.

The output of the amplifier 36 passes through a low-pass filter 40 to an amplifier 42. The output of the amplifier 42 energizes an electroacoustical output transducer 44 acoustically coupled to the transmitter of a conventional telephone handset 46.

At the receiving end, an input transducer 48 picks up the acoustical output of the earpiece in a handset 50. The output of the transducer 48 in turn is amplified by an amplifier 52 and then passed through a band-pass filter 56. The output of the filter 56 is amplified by a gain-controlled amplifier 58 and then passed through a level-restoring circuit 60 to an output amplifier 62. The output of the amplifier 62 in turn is rectified by a rectifier 64 and applied to a printing stylus 66, in the printer 17, in contact with the facsimile document 18.

The document 18 is mounted on a drum 68 rotated by a motor 70. The stylus 66 is moved along the drum by an indexing arrangement similar to the one involving the scanning head 24, so that the stylus contacts the document 18 along successive points corresponding to the respective points on the document 12 scanned by the head 24. The document 18 is of a material of the type described in the aforementioned U.S. Patent so that electric current from the stylus passing through the document darkens the latter according to the intensity of the current. The current intensity in turn depends on the reflectivity sensed by the scanning head 24 and therefore, at each point contacted by the stylus 18, the reflectivity of the facsimile document 18 corresponds with that of the corresponding point on the document 12.

As pointed out above, the printing of an accurate facsimile of the original document 12 requires that the electric current passing through the stylus 66 be standardized and, in particular, that it have a predetermined level independent of such factors as the transmission characteristics of the telephone connection 14. This function is accomplished by a gain control unit 72 which senses the amplitude of the output of the amplifier 58 and controls the gain of the amplifier so as to standardize the output of the latter and thereby standardize the stylus current.

With further reference to FIG. 1, the drum 20 carries a black stripe 74 disposed between the edges of the document 12. The stripe passes beneath the reading head 24 once during each revolution of the drum, i.e. between the scanning of successive lines on the document, and during this brief interval the transmitter 10 thus transmits a signal corresponding to black. As pointed out above, this signal will have the maximum amplitude by virtue of the particular modulation arrangement employed in the system. This black signal is sensed by the gain control unit 72 in the output of the amplifier 58 and the gain control unit then adjusts the receiver gain to provide a standard output voltage from the amplifier 58.

As shown in FIG. 2, the gain control unit 72 includes a voltage divider comprising a series resistor 76 and a resonant tank circuit 78 tuned to the carrier frequency of the system. The output of the amplifier 58 is applied across this series combination, which thus acts as a filter having a sharply peaked response at the carrier frequency. The voltage across the tank circuit 78 is applied through a capacitor 80 to a rectifier diode 82 and a DC restorer diode 84. The diode 82 passes peak positive portions of the carrier signal to a normally nonconducting transistor 86.

If these positive portions exceed a predetermined threshold voltage (adjusted as described below) they turn on the transistor 86 briefly. The corresponding AC component at the collector of the transistor 86 is passed by a capacitor 88 to a rectifier and DC restorer comprising diodes 90 and 92. The current through the diode 90 charges the gain control capacitor 94 by way of a series resistor 96. The voltage across the capacitor 94 controls the gain of the receiver 12 in a manner to be described.

Specifically, an increase in capacitor voltage (i.e. in the negative direction) decreases the receiver gain and a decrease in this voltage increases the gain. Thus, the capacitor voltage increases and the receiver gain decreases until the voltage across the tank circuit 78 is essentially insufficient to turn on the transistor 86 and therefore insufficient to increase the capacitor voltage any further.

It should be noted that once the capacitor 94 has approached this final voltage, the transistor 86 will be turned on only by maximum amplitude signals, i.e. "black" signals. These signals are generated by the black stripe 74, as well as any black portions on the document to be reproduced. Thus, at least once every revolution of the transmitter drum 20 a short burst of charging pulses will be applied to the capacitor 94 to replace the small amount of charge that has discharged therefrom, assuming that the incoming signal strength has not changed. If the signal strength has increased, these charging pulses will be greater in magnitude so as to increase the capacitor voltage and thereby decrease the receiver gain. Conversely, if the incoming signal strength has decreased, the voltage across the tank circuit 78 will be insufficient to turn on the transistor 86 and thus no charge will be added to the capacitor 94. Rather, the capacitor will be discharged in a manner now to be described.

The AC component at the collector 86*c* of the transistor 86 is passed by a capacitor 104 to a rectifier comprising a diode 106 and the base-emitter junction of a normally nonconducting transistor 108. Thus, when the output of the amplifier 58 is sufficient to turn on the transistor 86, the transistor 108 also conducts, thereby discharging a capacitor 110.

On the other hand, if the transistor 86 fails to turn on for a predetermined length of time, e.g. the time required for three or four rotations of the drums 12 and 68 (FIG. 1), the transistor 108 will remain nonconducting for this length of time. The capacitor 110 will then be charged through a resistor 112 to a sufficiently high voltage to overcome the breakdown voltage of a transistor 114 connected to operate as a Zener diode, thereby opening up a conducting path between the capacitor 94 and the capacitor 110 and resistor 112. This causes a rapid decrease in the voltage on the capacitor 94. Accordingly, since the transistor 108 will fail to conduct only when the "black" output voltage of the amplifier 58 has decreased, this arrangement provides an efficient and simple mechanism for rapidly decreasing the voltage on the capacitor 94 when the strength of the incoming signal decreases.

Thus, the gain control unit 72 includes a capacitor charging circuit that operates when the strength of the incoming signal increases and a separate discharge circuit that operates when the signal strength decreases for a specified time. By thus employing a discharge circuit that is switched on only when needed, we can provide the gain control capacitor with a very long normal discharge time constant, thereby substantially eliminating variations in the tone of the facsimile which would result from a more rapid normal discharge of the capacitor.

From the foregoing it will be apparent that the threshold voltage of the transistor 86 determines the receiver gain for a given signal strength; and it thus determines the standardized voltage at the output of the amplifier 48. Because of variations in the characteristics of the level restoring circuit 60, it is desirable to be able to adjust the standardized voltage. We accomplish this by adjusting the transistor 86 threshold voltage.

More specifically, the collector-emitter path of the transistor 86 is in series with the emitter-collector path of a transistor 98. The base 98*b* of the transistor 98 is connected to the tap of a potentiometer 100 and adjustment of the potentiometer thus controls the base voltage of this transistor. This in turn determines the voltage at the emitter 98*e* which will turn on the transistor 98 and in turn, the voltage at the base 86*b* which will turn on the transistor 86. Thus, the positive-going portions of the voltage across the tank circuit 78 will turn on the transistor 86 when they are roughly equal to the voltage at the tap of the potentiometer 100 (except for the voltage dropped across the diode 82 and the base-emitter junctions of the transistors 86 and 98).

Accordingly, the setting of the potentiometer 100 determines the threshold voltage of the transistor 86 and thereby determines the standardized output voltage of the amplifier 58.

The gain control unit 72 adjusts the gain of the amplifier 58 by varying the amount of negative feedback in the amplifier. Specifically, the amplifier, which is shown as a differential amplifier, is provided with feedback by means of a voltage divider comprising a resistor 116 in series with the parallel combination of a resistor 118 and a resistor 120 in series with a field effect transistor 122. Thus, the feedback ratio depends on the resistance of the transistor 122. In particular, the feedback ratio increases, with a decrease in amplifier gain, when the resistance of the transistor 122 increases and, conversely, the gain of the amplifier 58 increases when the resistance of the transistor decreases. The transistor resistance increases and decreases in direct relation with the magnitude of the gain control voltage across the capacitor 94, so that, as noted above, an increase in the gain control voltage decreases the receiver gain and a decrease in this voltage increases the gain.

A resistor 124 provides the operating voltage for the transistor 122 and a capacitor 126 serves as a direct-current blacking capacitor. In order to minimize frequency distortion, this capacitor should have a low impedance over the information frequency band relative to the resistances in the feedback network.

One might well expect that the optimum modulation index for the system would be 100 percent. However, a smaller degree of modulation, e.g. 50 percent, is generally preferable. Thus, with a "black" signal providing the maximum carrier amplitude, as described above, a fully "white" signal would have half that amplitude. For the stylus 66 to "print" white, there should be zero current through the stylus. This means that the white signal level should be translated down to zero before it is applied to the stylus. Put another way, the residual signal level below the white level should be subtracted from the signal received by the receiver 16. This is accomplished as follows by the level restoring circuit 60.

The output of the amplifier 58 is passed through a coupling capacitor 128 and a Zener diode 130 to the tap of a potentiometer 132. A reverse bias is applied to the Zener diode 130 by way of a resistor 134 and the potentiometer 132. The tap on the potentiometer 132 is adjusted so that the bias voltage is one-half the sum of the breakdown voltages of the diode 130 in the forward and reverse modes. Thus, for current to flow in either direction through the diode 130, the output voltage of the amplifier 58 must exceed one-half the diode breakdown voltage in the positive or negative direction. When the instantaneous amplifier output voltage is less than that, no current flows through the diode 130. There is then no AC component at the tap of an output potentiometer 138 and therefore no signal is passed by a coupling capacitor 140 to the amplifier 62.

On the other hand, whenever the instantaneous output voltage of the amplifier 58 is greater than one-half the breakdown voltage of the diode 130, the diode conducts, thereby providing an AC component that is passed by the capacitor 140.

In this way, the level restoring circuit 60 effectively subtracts from the output of the amplifier 58 an AC voltage whose peak-to-peak value equals one-half the breakdown voltage of the Zener diode 130. The potentiometer 100 in the gain control unit 72 is adjusted so that the "white" signal level from the amplifier 58 is just equal to this voltage. Thus, the threshold voltage for printing is the white signal level. That is, current is passed through the stylus 66 (FIG. 1) to the document 18 only when the signal level is from a portion of the original document 12 that has a grey or darker tone.

With the amplifier gain thus adjusted for the white signal level, the potentiometer 138 is adjusted to provide black on the facsimile 18 when a black level signal is received. Specifically, it is adjusted so that the stylus 66 will print black in response to a black signal, but not when the signal amplitude is below that level. With the two end points of the tone range, i.e. white and black, thus fixed, the receiver will also reproduce the greys in between.

With further reference to FIG. 2, the amplifier 62 is provided with a negative feedback network comprising the parallel combination of a resistor 142, a capacitor 144 and a pair of Zener diodes 146 and 148 connected in series opposition. The resistor 142 and capacitor 144 are included for amplifier stabilization. The diodes 146 and 148 greatly increase the amount of feedback in the amplifier 62 when the difference between the amplifier input and output voltages exceeds the diode breakdown voltage. Because of their very low resistance at voltages exceeding their breakdown voltage, they thus effectively limit the output voltage of the amplifier and thereby prevent excessive current in the stylus 66 as a result of sudden excessive input voltages due, for example, to noise spikes picked up by the receiver.

The diodes 146 and 148 also provide a contrast-increasing function which is used when printed documents, as opposed to photographic material, is being received. Whenever material is to be reproduced in black and white, i.e. without grays, a switch 150 is opened to disconnect a resistor 141 connected between ground and the tap of the potentiometer 138. An increased voltage is thus applied to the amplifier 62. Input signal voltages which would otherwise be printed as grey will then provide a sufficiently large output voltage from the amplifier 62 to pass a black printing current through the current 66. On the other hand, the signals corresponding to darker tones would then cause excessive stylus current, a problem which is eliminated by the current-limiting action of the diodes 146 and 148.

With reference to FIG. 1, the rectifier 64 preferably includes a transformer that steps up the output voltage of the amplifier 62 and, more importantly, provides a corresponding increase in output impedance. This increase in impedance should be sufficient to provide an essentially constant current source for the stylus 66, so that the current through the stylus is substantially independent of the contact resistance between the stylus and the facsimile document 18 and also independent of the local resistivity of the document. The stylus current, which is the determining factor for the darkness of the point contacted by the stylus, will therefore depend solely on the input voltage of the amplifier 62.

For facsimile transmission, the characteristics of telephone interconnections are generally substantially better in the middle frequency range of the telephone pass band than at higher frequencies. Accordingly, since there is a limit to the total power than can be coupled onto the telephone line, we prefer to concentrate most of the power into the lower side band of the modulated carrier. By way of example, the carrier frequency may be 2kHz and the highest information frequency component may be of the order of 1kHz. The modulated signal from the amplifier 36 will then extend roughly from 1kHz to 3kHz. The low pass filter 40 may have an attenuation of 60db per octave, with its half power point at the carrier frequency. With this arrangement, the signal transmitted into the handset 46 will be largely concentrated in the lower side band, with the carrier attenuated by 50 percent and with some upper side band being transmitted.

The filter 56 in the receiver 16 will then have a pass band from 1kHz to 2kHz, corresponding to the lower side band. This filter need not have as sharp cutoff characteristics as the low pass filter 40.

In some cases it may be desirable to provide communication between the facsimile transmitter and receiver at frequencies other than the facsimile carrier frequency. For example, the transmitter and receiver may exchange signals prior to the facsimile transmission in order to make sure that the system is operating properly and to obtain rough initial synchronism of the drums 20 and 68 (FIG. 1). In such cases, there will be no gain control unit input at the resonant frequency of the tank circuit 78, and therefore the gain control unit 72 will not operate in the manner described above. However, the gain of the amplifier 58 should be controlled in order to prevent overloading of the amplifier and consequent distortion. Therefore, we hive provided a further input arrangement for the gain control capacitor 94, comprising a coupling capacitor 152, a rectifying diode 154 and DC restoring diode 156.

Whenever the output of the amplifier 58 exceeds the sum of the voltage on the capacitor 94 and the breakdown voltage of a Zener diode 158, the capacitor 94 is charged through a resistor 160. The Zener diode 158 permits the amplifier 58 to operate at full gain except for signals that would otherwise be strong enough to saturate the amplifier. Thus, the amplifier 58 will normally provide its maximum undistorted output during the signalling function.

When signalling has been completed and facsimile transmission is to begin, a switch 162 is automatically opened to disconnect the diode 156 from ground. Rectification by the diode 154 then essentially blocks the capacitor 152 and thereby prevents charging of the gain control capacitor 94 through this path.

It will be apparent that one may make numerous modifications in the system described above without departing from the scope of the invention. For example, the receiver gain may be controlled at other points instead of, or in addition to, the amplifier 58. For example, the output of the gain control unit 72 may be used to control the level of the input signal to the band pass filter 56. Also, various details of the gain control unit itself might be modified without altering its basic mode of operation. Again, in some cases it might be preferable to accomplish the level restoring function by directly subtracting from the received signal an alternating voltage having the frequency of the carrier.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. In a facsimile transmission system of the type comprising a transmitter arranged to transmit signals corresponding to the contents of a document to a remote receiver arranged to print a facsimile of the document in response to said signals, the improvement comprising a gain control system including A. means at said transmitter for periodically transmitting to the receiver a standard information signal corresponding with a predetermined document tone, B. a controllable gain device arranged to control the gain of said receiver so as to provide a standardized signal in response to the signal received from said transmitter, C. a gain control unit at said receiver, said gain control unit being continuously electrically connected to the controllable gain device to receive signals therefrom;

having an energy storage device connected to set said controllable gain device according to the content of said storage device, and having means selectively responsive to the amplitude of said standardized signal as passed by said controllable gain device to change the content of said storage device in such manner as to minimize variations in the amplitude of said information signals passed by said controllable gain device due to factors other than the tones in said document.

2. The system defined in claim 1 including means for increasing the content of said energy storage device when the amplitude of the standard signal passed by said controllable gain device is above a predetermined control level.

3. The system defined in claim 2

A. in which said energy storage device has a discharge time constant substantially longer than its charging time constant, and B. including means for reducing the discharge time constant when the amplitude of the standard signal passed by said controllable gain device is below said control level.

4. The system defined in claim 1 in which said standard signal has the same level as an information signal corresponding to the document tone providing the greatest amplitude in said receiver.

5. The system defined in claim 4

A. in which said transmitter develops said information signals by amplitude modulating a carrier in accordance with tones successively sensed in said document, and B. said standard signal has the frequency of said carrier.

6. The system defined in claim 2

A. in which the range of document tones from lightest to darkest corresponds with an amplitude range in the output of said controllable gain device, the lower end of said amplitude range having a finite reference level, and B. including means subtracting from said standardized signal a signal having said reference level, whereby the threshold of printing of said facsimile corresponds to said finite level.

7. The system defined in claim 6 in which

A. said subtracting means subtracts a fixed signal level from said standardized signal, and B. said control level is such as to make the lower end of said amplitude range as applied to said subtracting means substantially equal to said reference level.

8. The system defined in claim 7 including means for adjusting the signal level from said subtracting means so as to make the upper end of the signal level range in the output thereof correspond to the other end of said tone range.

9. A facsimile system according to claim 1 in which the gain control unit has a frequency-selective filter at the input thereof connected to said controllable gain device and providing an output above a selected threshold only in response to said standard signal.

10. A rotary drum facsimile receiver comprising

A. signal conditioning means for modifying the input to said receiver,

B. a printer arranged to print a facsimile in response to the output of said signal conditioning means, C. signal standardizing means comprising 1. a controllable gain device in said signal conditioning means, and 2. a gain control unit a. operable independently of drum position;

b. including means selectively responsive, only during the interval the standardized signal is transmitted, to the amplitude of a standard signal as passed by said controllable gain device to control the gain thereof so as to provide a predetermined fixed level for said standard signal in the output of said controllable gain device regardless of the level of said standard signal as received by said receiver.

11. A facsimile receiver according to claim 10 in which

A. the controllable gain device comprises an amplifier having an active amplifying element connected in negative feedback relation thereto and providing a feedback dependent on the impedance of said element; and B. the gain control unit includes 1. an accumulator connected to said active amplifying element to control the operating point of said element and therefore the impedance of said element;

2. means for incrementing the accumulator when the standard signal passed by said amplifier exceeds said predetermined fixed level;

3. means for decrementing the accumulator when the standard signal passed by the amplifier falls below said level;

4. whereby the impedance of said element is determined by said standard signal.

12. A facsimile receiver according to claim 11 in which said accumulator is a capacitor.

13. A facsimile receiver according to claim 10 in which said gain control unit is continuously electrically connected to said controllable gain device to receive signals therefrom during a facsimile transmission.

14. A facsimile receiver according to claim 13 in which the gain control unit has a frequency-selective filter at the input thereof connected to said controllable gain device providing an output above a selected threshold only in response to said standard signal.

* * * * *